US009004538B2

(12) United States Patent
Eklund et al.

(10) Patent No.: US 9,004,538 B2
(45) Date of Patent: Apr. 14, 2015

(54) AERODYNAMIC MUD FLAP

(71) Applicant: Fleet Engineers, Inc., Muskegon, MI (US)

(72) Inventors: Wesley K. Eklund, Muskegon, MI (US); Thomas Gerst, Twin Lake, MI (US); Gary Roberts, Fruitport, MI (US); Walter Hill, Muskegon, MI (US)

(73) Assignee: Fleet Engineers, Inc., Muskegon, MI (US)

( * ) Notice: Subject to any disclaimer, the term of this patent is extended or adjusted under 35 U.S.C. 154(b) by 0 days.

(21) Appl. No.: 13/910,491

(22) Filed: Jun. 5, 2013

(65) Prior Publication Data

US 2013/0320658 A1     Dec. 5, 2013

Related U.S. Application Data

(60) Provisional application No. 61/655,693, filed on Jun. 5, 2012.

(51) Int. Cl.
*B62D 25/16* (2006.01)
*B62D 25/18* (2006.01)

(52) U.S. Cl.
CPC .............. *B62D 25/18* (2013.01); *B62D 25/188* (2013.01)

(58) Field of Classification Search
CPC .... B62D 25/16; B62D 25/161; B62D 25/168; B62D 25/188
USPC .......................................... 280/848, 847, 851
See application file for complete search history.

(56) References Cited

U.S. PATENT DOCUMENTS

| D167,061 | S | | 6/1952 | Schwartz | |
|---|---|---|---|---|---|
| 2,619,363 | A | * | 11/1952 | Wenham et al. | 280/851 |
| 2,699,955 | A | * | 1/1955 | Eaves et al. | 280/851 |
| 3,279,818 | A | * | 10/1966 | Jones | 280/851 |
| 3,350,114 | A | * | 10/1967 | Salisbury | 280/851 |
| 3,582,108 | A | * | 6/1971 | Carlton | 280/851 |
| 3,724,871 | A | | 4/1973 | Evans | |
| D235,633 | S | | 7/1975 | Cooper | |
| 4,205,861 | A | | 6/1980 | Roberts et al. | |
| D263,696 | S | | 4/1982 | Regler | |
| 4,382,606 | A | * | 5/1983 | Lightle et al. | 280/851 |

(Continued)

FOREIGN PATENT DOCUMENTS

| CA | 1217521 | 2/1987 |
|---|---|---|
| CA | 2417132 | 7/2003 |

(Continued)

*Primary Examiner* — J. Allen Shriver, II
*Assistant Examiner* — Steve Clemmons
(74) *Attorney, Agent, or Firm* — McGarry Bair PC

(57) ABSTRACT

A motor vehicle mud flap is a plate-like body having a suspension section, a quadrant section, and an extension section. The suspension section is adapted for attachment to a mud flap bracket for suspension of the mud flap therefrom. The quadrant section is coupled with the suspension section and has an array of elongate through-openings. The extension section is coupled with the quadrant section and has an array of elongate through-openings. The array of elongate through-openings is defined by alternating recesses and ribs in parallel and longitudinal disposition. Each recess is configured as a pair of opposed elongate shallow recesses fluidly coupled by an elongate through-opening having a width less than the width of each recess. Water and air can flow through the recesses, and debris larger than the width of the through-openings is deflected by the mud flap.

16 Claims, 5 Drawing Sheets

(56) References Cited

U.S. PATENT DOCUMENTS

| | | | |
|---|---|---|---|
| D272,336 S | 1/1984 | Lightle et al. | |
| 4,427,208 A | 1/1984 | Jurges | |
| D279,560 S | 7/1985 | Jensen | |
| D281,966 S | 12/1985 | Lockwood | |
| D282,158 S | 1/1986 | Wright | |
| 4,564,204 A | 1/1986 | Sullivan et al. | |
| 4,585,242 A | 4/1986 | Sparks | |
| 4,660,846 A | 4/1987 | Morin | |
| 4,796,905 A * | 1/1989 | Sullivan | 280/851 |
| 4,796,906 A * | 1/1989 | Sullivan | 280/851 |
| 4,921,276 A * | 5/1990 | Morin | 280/848 |
| D308,354 S | 6/1990 | Thomas, Jr. | |
| 5,022,680 A * | 6/1991 | Eklund, Jr. | 280/851 |
| 5,080,397 A * | 1/1992 | Metcalf | 280/851 |
| D330,692 S | 11/1992 | Hammond, Jr. | |
| 5,205,590 A * | 4/1993 | Drabing et al. | 280/851 |
| D338,863 S | 8/1993 | Nakayama | |
| 5,257,822 A * | 11/1993 | Metcalf | 280/851 |
| 5,273,318 A | 12/1993 | Nakayama et al. | |
| 5,366,247 A * | 11/1994 | Fischer | 280/851 |
| 5,582,430 A * | 12/1996 | Bauer et al. | 280/851 |
| 6,786,512 B2 * | 9/2004 | Morin et al. | 280/847 |
| 6,851,717 B1 * | 2/2005 | Andersen | 280/847 |
| 6,938,929 B2 | 9/2005 | Cicansky | |
| 7,625,013 B2 * | 12/2009 | Kellick | 280/851 |
| 8,146,949 B2 * | 4/2012 | Surti | 280/851 |
| 8,579,314 B2 * | 11/2013 | Prazen et al. | 280/154 |
| RE44,755 E * | 2/2014 | Surti | 280/851 |
| 2003/0011188 A1 * | 1/2003 | Andersen | 280/847 |
| 2003/0141713 A1 * | 7/2003 | Morin et al. | 280/847 |
| 2004/0080185 A1 * | 4/2004 | Loddo | 296/198 |
| 2006/0016717 A1 * | 1/2006 | Ritter | 206/526 |
| 2007/0278781 A1 | 12/2007 | Downes | |
| 2008/0129031 A1 | 6/2008 | Nelsen | |
| 2011/0049144 A1 * | 3/2011 | Koefelda et al. | 220/6 |

FOREIGN PATENT DOCUMENTS

| | | | |
|---|---|---|---|
| EP | 0396873 A1 | 11/1990 | |
| EP | 0310130 B1 | 2/1992 | |
| EP | 0310130 B1 * | 12/1992 | B62D 25/18 |
| EP | 1332951 A1 | 6/2003 | |
| FR | 2859159 A1 * | 3/2005 | B62D 25/18 |
| GB | 996138 | 4/1964 | |
| GB | 1058892 | 1/1965 | |
| GB | 2146598 A | 4/1985 | |
| GB | 2184702 A | 7/1987 | |
| GB | 2200879 A * | 8/1988 | B62D 25/18 |
| GB | 2209720 A * | 5/1989 | B62D 25/18 |
| JP | 6072356 A | 3/1994 | |
| WO | WO 8604030 A1 * | 7/1986 | B62D 25/18 |

* cited by examiner

AERODYNAMIC MUD FLAP

CROSS-REFERENCE TO RELATED APPLICATION

This application claims the benefit of U.S. Provisional Patent Application No. 61/655,693, filed Jun. 5, 2012, which is incorporated herein by reference in its entirety.

BACKGROUND OF THE INVENTION

1. Field of the Invention

The invention relates generally to motor vehicle mud flaps. More particularly, the invention relates to a motor vehicle mud flap with aerodynamic properties. In one of its aspects, the invention relates to a mud flap that effectively breaks up trailing air vortex which tends to pull backward out of effective blocking position. In another of its aspects, the invention relates to a mud flap that is adapted to be used with normal or shorty brackets. In another of its aspects, the invention relates to a mud flap that is designed to withstand severe cold temperature. In another of its aspects, the invention relates to a mud flap that stacks neatly and nests on shipping skids for storage and shipping. In another of its aspects, the invention relates to a mud flap that is constructed to resist bending and racking. In another of its aspects, the invention relates to a mud flap that has improved aerodynamic properties for less drag and therefore reduces fuel costs. In another of its aspects, the invention relates to a mud flap that reduces spray. In another of its aspects, the invention relates to a mud flap that has anti-sail properties and eliminates the need for anti-sail brackets. In another of its aspects, the invention relates to a mud flap that improves venting of excess heat around tires and brakes. In another of its aspects, the invention relates to a mud flap that has identical front and back faces so that it can be mounted on the vehicle with either face facing the wheels. In another of its aspects, the invention relates to a mud flap that is symmetric about a plane parallel to the front and back face and midway between the two faces. In another of its aspects, the invention relates to a mud flap that is symmetric about a central axis so that the mud flap can be mounted on either side of the vehicle.

2. Description of the Related Art

Mud flaps are ubiquitous on motorized vehicles such as trucks having relatively large tires. Mud flaps are utilized for stopping water, stones, and other roadway debris from being launched by a vehicle's tires into the path of following traffic. To work effectively, mud flaps are typically mounted to a vehicle to hang immediately to the rear of the tires from a bracket positioned somewhat above or near the top of the tires to just above the roadway. Conventional solid panel mud flaps are effective barriers against water and roadway debris, but have several disadvantages.

First, such mud flaps tended to sail, lifting the lower portion of the mud flap away from the roadway, thereby enabling water and debris to flow beneath the mud flap and onto windshields of trailing vehicles. Typically anti-sail brackets are mounted to the vehicle behind the mud flaps to restrain the sailing tendency of the mud flaps, thereby adding weight to the vehicle. Second, solid panel mud flaps are typically heavy and, consequently, can significantly reduce a vehicle's fuel efficiency. Third, because the flow of air in the region of the wheels can be blocked by solid section mud flaps, the tires, brakes, and bearings can generate high temperatures during use that can lead to failure, premature wear, and reduced service. Fourth, it can be desirable to utilize a mud flap having a configuration conventionally known as a "shortie," which can necessitate the costly replacement of a standard mud flap with a "shortie," or can involve complex modifications to a standard mud flap. Finally, traditional mud flaps tend to atomize water droplets, creating a spray that can affect road visibility for passing and trailing vehicles. Typically, the spray created by the mud flaps migrates around the sides of the mud flap, where it can be projected into the path of other vehicles traveling behind and adjacent the mud flaps.

BRIEF DESCRIPTION OF THE INVENTION

According to the invention, a motor vehicle mud flap comprises a longitudinal plate-like body having an obverse face, a suspension section, a quadrant section, and, optionally, an extension section in longitudinal alignment. The suspension section is adapted for attachment to a mud flap bracket for suspension of the mud flap therefrom. The quadrant section is coupled with the suspension section and has an array of elongate through-openings arranged in a diagonal pattern at an acute angle to a longitudinal axis of the mud flap. The extension section is coupled with the quadrant section and has an array of elongate through-openings. The array of elongate through-openings is defined by alternating recesses and ribs in parallel and longitudinal disposition. Water and air can flow through the recesses, and debris larger than the width of the through-openings is deflected by the mud flap.

In one embodiment, each elongate through-opening may be configured as a pair of opposed elongate shallow recesses fluidly coupled by an elongate through-opening having a width less than the width of each recess.

In one embodiment, each rib is configured to have a cruciate cross-section, thereby forming recesses on the obverse face.

In another embodiment, the quadrant section has a first array of recesses oriented in a first direction, and a second array of recesses oriented in a second direction orthogonal to the first direction. The quadrant section may have four sections in which the elongate through-openings form a herringbone pattern. In addition, the four quadrants may have bilaterally symmetrical patterning formed by the arrays of elongate through-openings and ribs.

In another embodiment, the extension section has an array of recesses oriented at an acute angle relative to one of the first array of recesses and the second array of recesses.

In another embodiment, the quadrant section further comprising an unrecessed imperforate section oriented at the acute angle to the longitudinal axis of the mud flap. The imperforate section may be oriented in a downward direction and away from a central axis of the mud flap. The acute angle may be 45°.

In another embodiment, the plate-like body may have an obverse face and an opposed reverse face which have identical recess configuration whereby the obverse and reverse face have symmetry about a parallel plane between them. Further, the plate-like body may have a projecting rib on one face and a recess corresponding to the rib on the other face whereby multiple mud flaps can be stacked with ribs of one mud flap received in a corresponding recess in an overlying mud flap to reduce sliding of stacked mud flaps with respect to each other.

In a preferred embodiment, the obverse face and a reverse face have symmetry about a parallel plane between them as to at least the array of elongate through-openings and ribs in parallel disposition.

In addition, the obverse face as well as the reverse face may have symmetry about the longitudinal central axis of the mud flap body.

DESCRIPTION OF AN EMBODIMENT OF THE INVENTION

Figure 1:
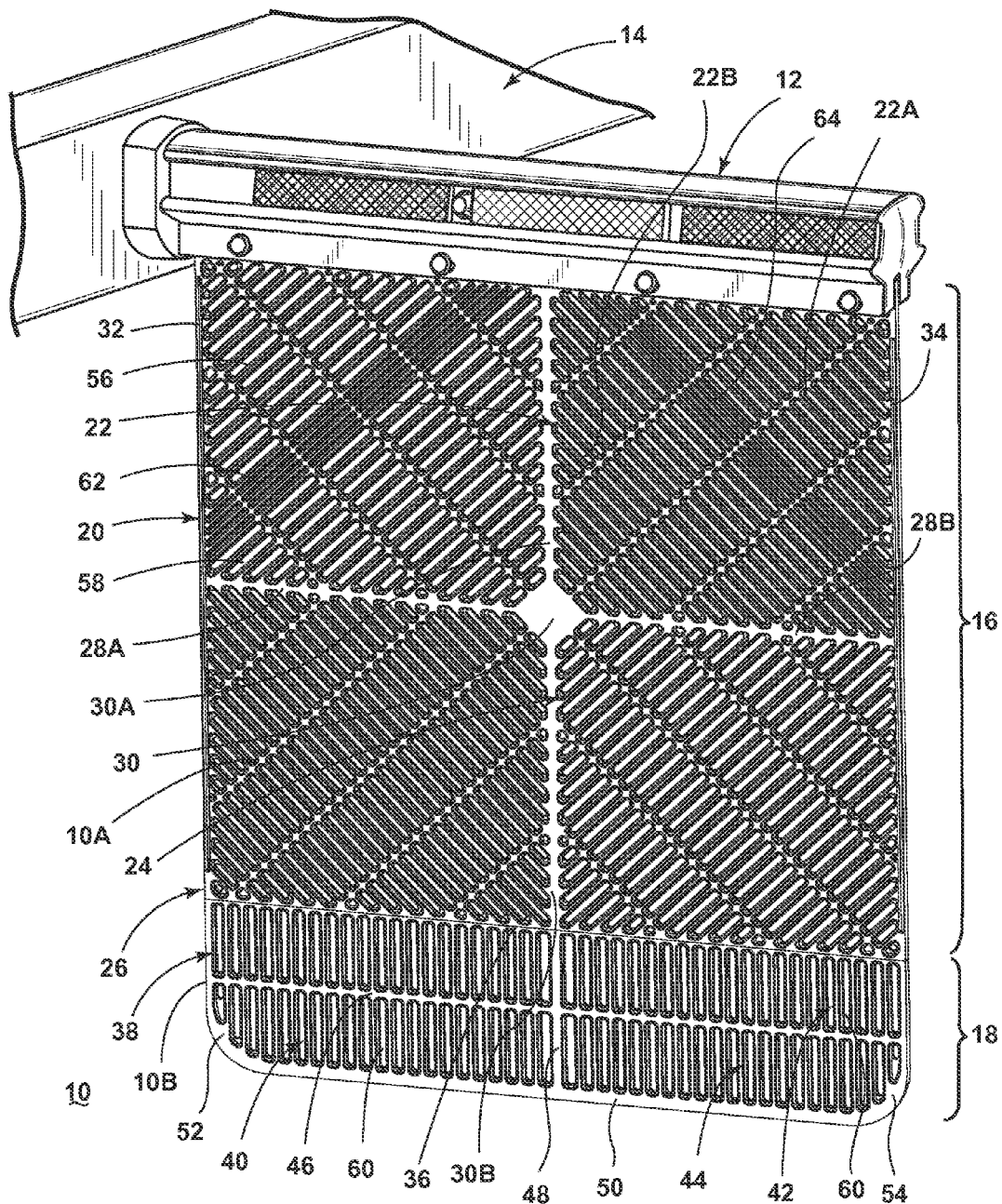
FIG. 1 is a perspective view of an embodiment of the invention illustrating a mud flap suspended from a support bracket extending from a vehicle frame member.
Figure 6:
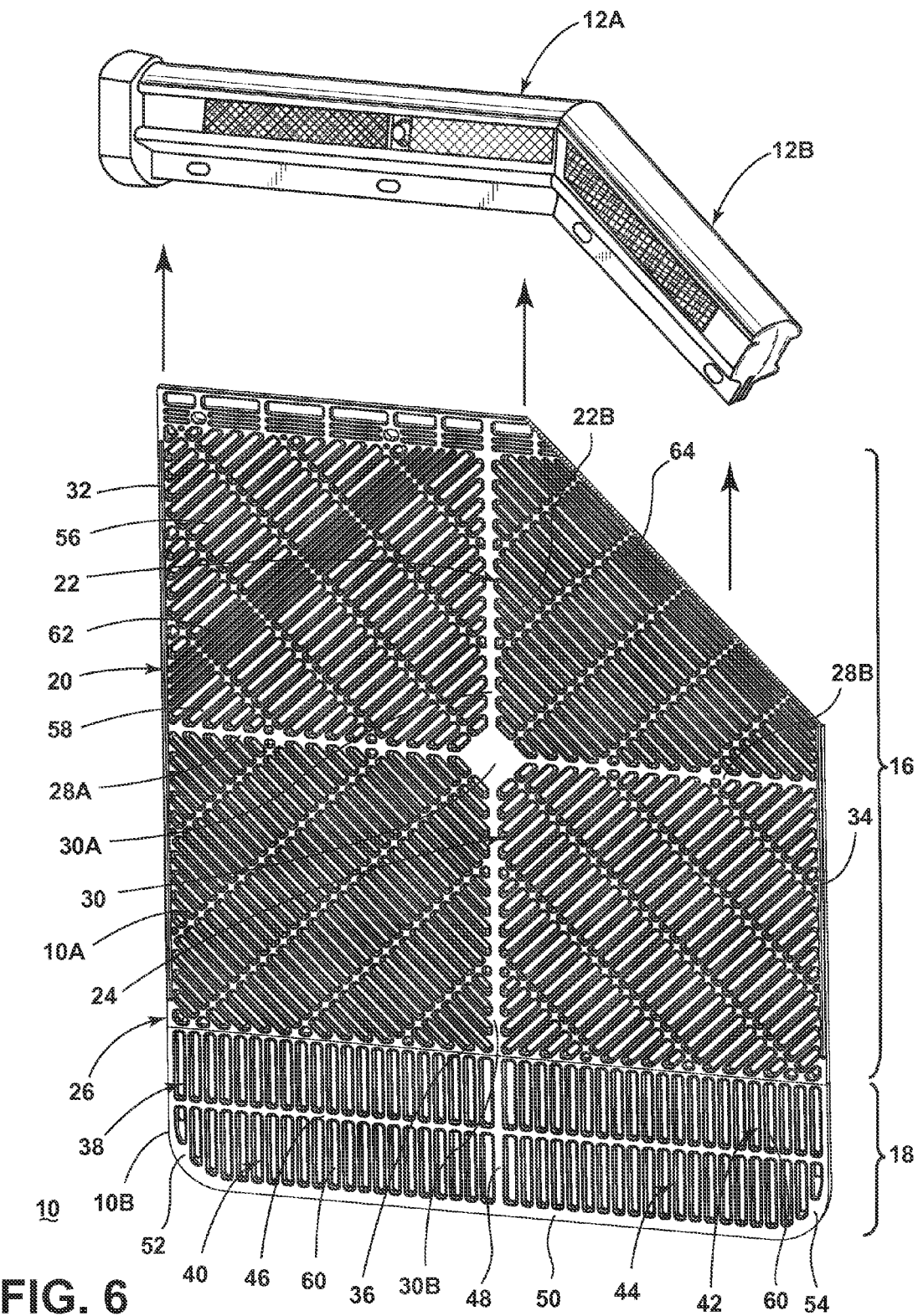
FIG. 6 is an exploded perspective view of a second embodiment of the invention illustrating a mud flap having a "shortie" configuration suspended from a complementary support bracket.

Referring now to the drawings, and particularly to FIG. 1, an exemplary embodiment of the invention is illustrated comprising a plate-like aerodynamic mud flap 10 having an obverse face 10A and an opposed reverse face 10B. The mud flap 10 can be fabricated of a polymeric material, such as a thermoplastic, and can be fabricated by a suitable injection molding process. Polypropylene is the preferred material for the mud flap. Each face 10A, 10B can have an identical pattern as illustrated in the drawings. The incorporation of identical patterning on each face 10A, 10B means that either face 10A or 10B can face the wheel and can facilitate molding of the mud flap 10. It avoids the necessity of manufacturing a mud flap for each side of the vehicle. This distinction becomes important when manufacturing "Shorty" mud flaps that have an upper outer corner that is removed as illustrated in FIG. 6.

The nominal thickness, or depth, of the mud flap 10, i.e. the distance separating the obverse face 10A and reverse face 10B, can be constant, with elements of the pattern generally defined by circular and elongate through openings, and shallow concavities. The mud flap 10 can be configured to be suspended from a support bracket 12 attached to a vehicle frame member 14. The mud flap can be customized, as will be described and illustrated hereinafter.

Figure 2:
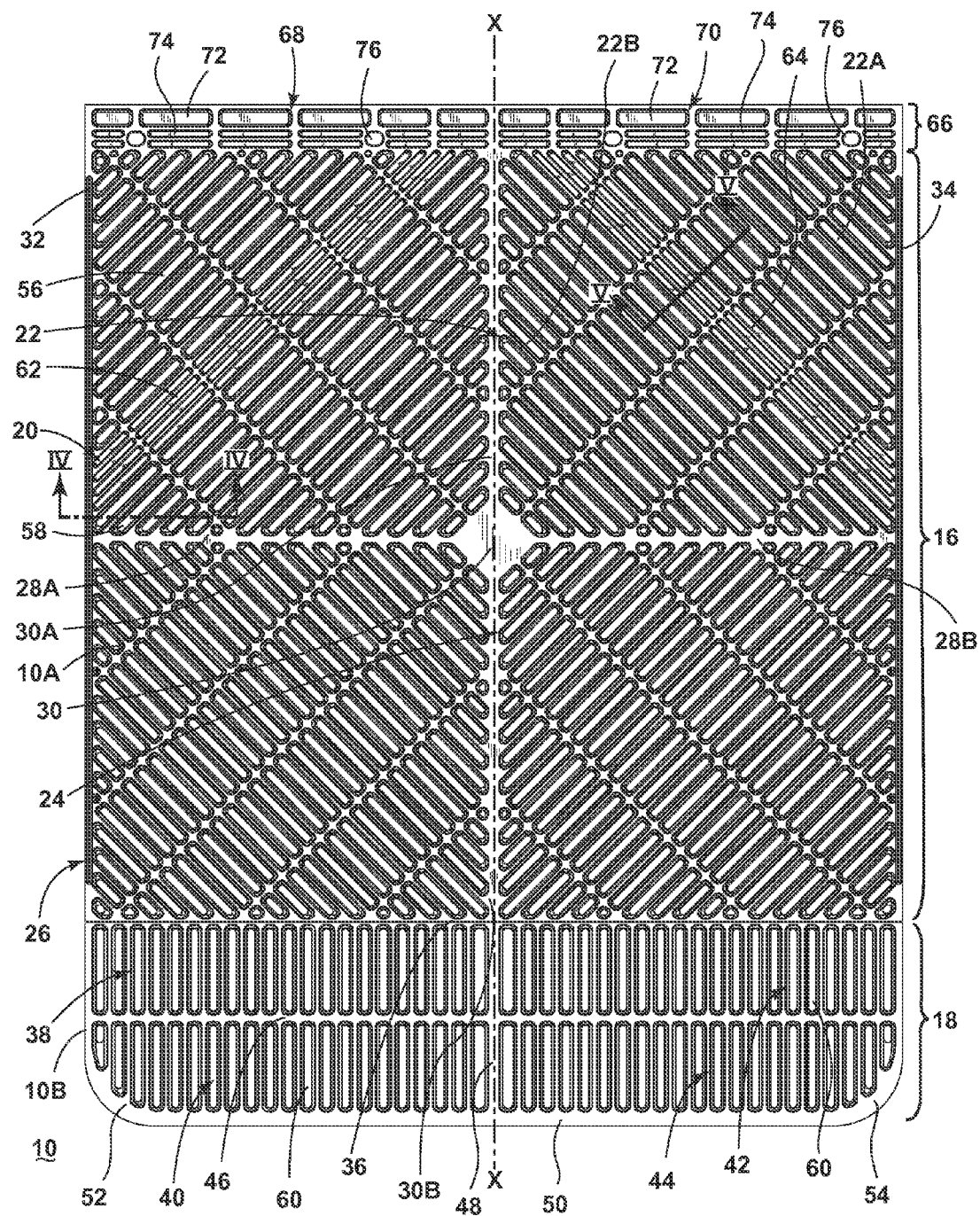
FIG. 2 is an elevation view of the mud flap illustrated in FIG. 1 with a top suspension section, a bottom extension section, and an intermediate quadrant section.

Referring also to FIG. 2, the mud flap 10 can be divided into 3 sections or sections—a suspension section 66, a quadrant section 16, and an extension section 18. The exemplary suspension section 66 can be an elongate, bilaterally symmetrical upper edge portion of the mud flap 10, including an exemplary first section 68 and second section 70 in longitudinally aligned horizontal disposition. Alternatively, the suspension section 66 can include a lesser or greater number of sections. Each section 68, 70 can include a row of generally elongate concavities 72, rows (for example, illustrated as numbering 2) of narrower generally elongate concavities 74, and a plurality of mounting apertures 76. The concavities 72, 74 do not extend through the mud flap 10. The mounting apertures 76 can extend through the mud flap 10, and can be configured to receive suitable known fasteners therethrough for suspending the mud flap 10 from a support bracket 12.

The exemplary quadrant section 16 can be a quadrilateral, such as a square as illustrated, or a rectangle, and can include four equal-sized section quadrants. Each pair of adjoining section quadrants can have bilaterally symmetrical patterning, including a plurality of elongate generally "paper clip oval" shaped through-openings arrayed in a plurality of rows extending at a 45° diagonal. The configuration of the patterning can reduce the twisting and bending, i.e. the "warping," that can otherwise occur with a lightweight porous mud flap. A greater or lesser number of rows can be included, and can be oriented at other than a 45° diagonal, for example, between 10 and 80°, preferably between 30 and 60°. Alternatively, the quadrant section 16 can include a lesser or greater number of section quadrants.

A first quadrant 20 and a second quadrant 22 can occupy an upper region of the quadrant section 16. A third quadrant 24 and a fourth quadrant 26 can occupy a lower region of the quadrant section 16. An upper quadrant vertical border 30A can extend along a midline of the section 16 between the first and second quadrants 20, 22, and a lower quadrant vertical border 30B can extend along a midline of the section 16 between the third and fourth quadrants 24, 26. The upper and lower borders 30A, 30B can be collinearly disposed. As an example, the first quadrant 20 and second quadrant 22 can be bilaterally symmetrical with respect to the upper quadrant vertical border 30A.

A first quadrant lower border 28A can extend linearly between the first quadrant 20 and the fourth quadrant 26, and a second quadrant lower border 28B can extend linearly between the second quadrant 22 and the third quadrant 24. The first and second borders 28A, 28B can be collinearly disposed. The vertical border 30A, 30B can intersect the orthogonal border 28A, 28B at a border intersection 30, which can have a diamond shape, as illustrated. Each quadrant is symmetrical with an adjacent quadrant. For example, quadrants 20 and 22 have symmetry with each other about the X-X axis as do quadrants 24 and 26. In addition, quadrants 20 and 26 have symmetry about border 28A and quadrants 22 and 24 have symmetry about border 28B.

The exemplary extension section 18 can include a first extension quadrant, or section 38, a second extension quadrant 40, a third extension quadrant 42, and a fourth extension quadrant 44 arranged in rows (for example, illustrated as numbering 2). Alternatively, the extension section 18 can include a lesser or greater number of sections.

The first and third quadrants 38, 42 can be separated from the second and fourth quadrants 40, 44 by an extension section border 46. The first and second quadrants 38, 40 can be separated from the third and fourth quadrants 42, 44 by an extension section vertical border 48 extending orthogonally to the extension section border 46, and which can be collinear with the upper and lower quadrant vertical borders 30A, 30B. The extension section 18 can be separated from the quadrant section 16 by an extension section upper border 36 extending parallel to the extension section border 46.

One or more quadrants, or rows of extension quadrants, can be removed to size or configure the mud flap 10 for a selected installation. The quadrants can be separated from the mud flap 10 by cutting along one or more of the extension section upper border 36, the extension section border 46, and the extension section vertical border 48. In addition, one or more rows of extension quadrants can be integrally formed with the mud flap 10 for different lengths. Therefore, the length of the mud flap 10 can be made in different lengths by either molding additional extension quadrants onto the bottom of the basic unit shown in the drawings, or removing one or both rows of extension quadrants from the mud flap 10 illustrated in the drawings. As an example, the mud flap 10 can be made in sizes of 24"×24", 24"×30" and 24"×36".

Each extension quadrant 38, 40, 42, 44 can include a row of generally elongate regularly spaced vertical openings 60 having a "paper clip oval" shape, which extend through the mud flap 10. The first vertical edge 32 and second vertical edge 34 can join the mud flap lower edge 50 in a first curved corner 52 and a second curved corner 54, respectively.

Figure 5:
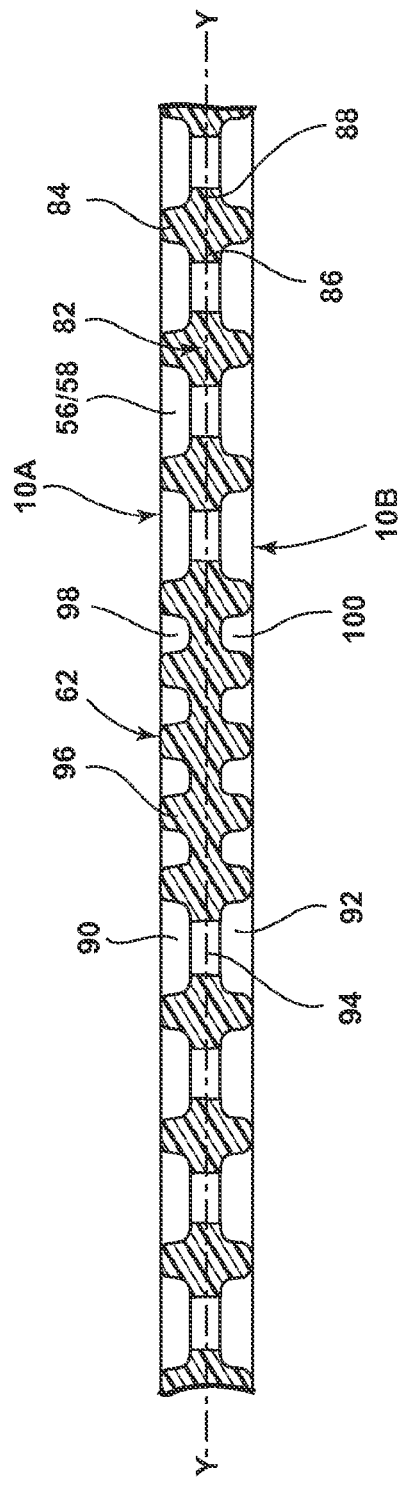
FIG. 5 is a sectional view taken along view line V-V of FIG. 2.

Referring also to FIG. 5, the first quadrant 20 can include a first shortie section 62, and the second quadrant 22 can include a second shortie section 64. The shortie sections 62, 64 can include a plurality of shallow elongate generally "paper clip oval" shaped concavities arrayed in a plurality of rows extending at a 45° diagonal to vertical. The shortie sections 62, 64 are illustrated as including 4 rows of concavities. However, a greater or lesser number of rows can be included, and can be oriented at other than a 45° diagonal.

Figure 3:
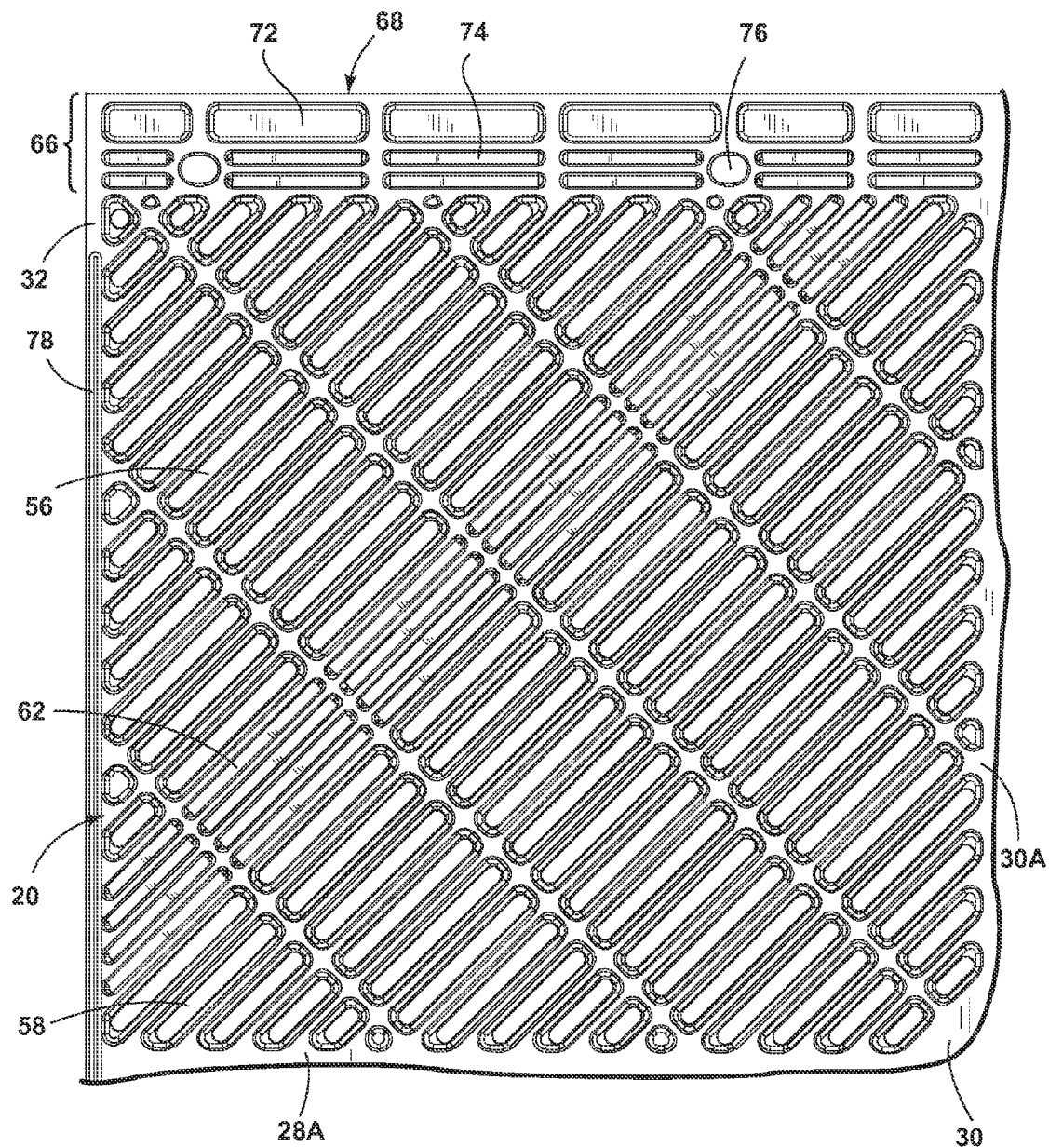
FIG. 3 is an enlarged elevation view of a portion of the top suspension section and quadrant section illustrated in FIG. 2.
Figure 4:
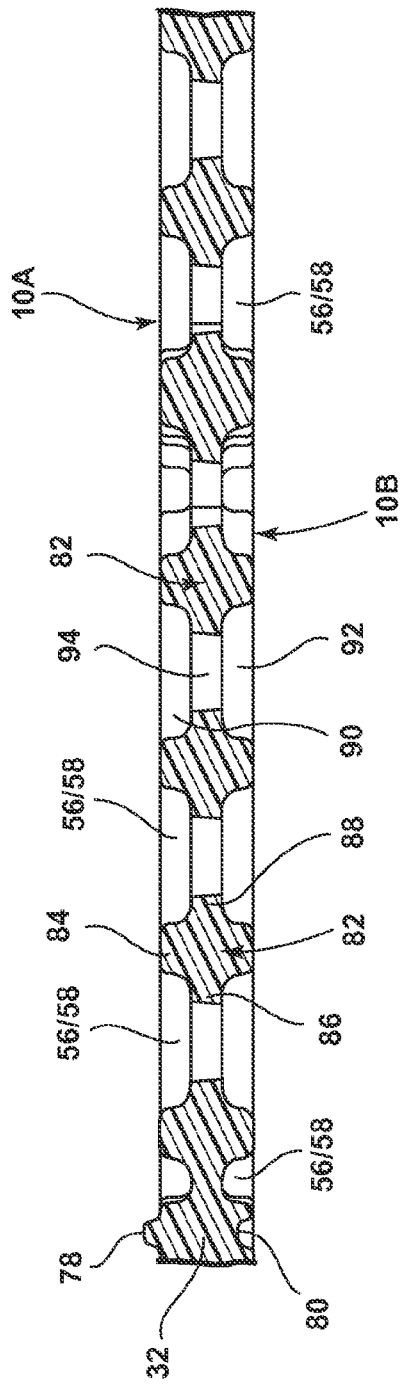
FIG. 4 is a sectional view taken along view line IV-IV of FIG. 2.

Referring also to FIGS. 3 and 4, the first vertical edge 32 can include a stacking tongue 78 extending along the quadrant section 16 above the plane of the obverse face 10A, shown also in FIG. 4. The second vertical edge 34 can include an identical stacking tongue 78. As illustrated in FIG. 4, the first vertical edge 32 can also include a stacking groove 80 extending below the plane of the reverse face 10B opposite the stacking tongue 78. The second vertical edge 34 can include an identical stacking groove 80. The tongues 78 and grooves 80 can be configured so that the tongues 78 can be received in the grooves 80 when mud flaps 10 are stacked one upon another, which prevent the mud flaps 10 from sliding relative to one another and thereby maintain a stack of mud flaps 10 in a stable, more readily handled bundle.

Referring also to FIG. 5, the quadrants 20, 22, 24, 26 can include alternating elongate quadrant through openings 56, 58 and elongate quadrant ribs 82. The ribs 82 have a cruciate cross-section, with a rib web 84 extending the full depth of the mud flap 10, and a pair of oppositely disposed lateral projections 86, 88 extending away from the mid-height of the rib web 84. Each pair of opposed lateral projections 86, 88 from adjacent ribs 82 define a first elongate shallow recess 90 and an opposed second elongate shallow recess 92 fluidly joined by an elongate through opening 94 having a width less than the width of each recess 90, 92.

As also illustrated in FIG. 5, the shortie section 62 can include a plurality of elongate shortie section ribs 96 having a cruciate cross-section. The ribs 96 are illustrated as numbering 5, but the actual number of ribs can be selectively greater or smaller. The shortie section ribs 96 can be integrated through joining of their lateral projections into a solid section 62. The shortie section ribs 96 can be divided by shallow elongate opposed grooves 98, 100 defined by the integrated lateral projections. The obverse face 10A and the reverse face 10B are symmetrical about a plane passing through the axis Y-Y of FIG. 5 and parallel to each of the faces.

Referring now to FIG. 6, a second exemplary embodiment of the invention is illustrated configured for suspension from a shortie mud flap support bracket comprising a primary support bracket 12A and a shortie support bracket 12B rigidly coupled together at an angle of about 135°. The mud flap 10 is illustrated as having a portion of the second quadrant severed from the mud flap 10 along an upper edge of the second shortie section 64 oriented at an angle of 45°, complementary to the angle between the primary support bracket 12A and the shortie support bracket 12B.

To suspend the mud flap 10 from the support bracket of FIG. 6, apertures along the remaining portion of the suspension section 66 can be aligned with apertures in the primary support bracket 12A, with suitable fasteners (not shown) passing through both apertures. Apertures can be formed in the shortie section 64 to align with apertures in the shortie support bracket 12B when the apertures in the suspension section 66 and the primary support bracket 12A can be aligned. The ability to selectively field install apertures in the shortie section 64 can facilitate precise alignment of the shortie section apertures and the shortie support bracket apertures in circumstances, for example, such as variation in the inclination of the shortie bracket from the primary bracket as a matter of design, fabrication defects, misalignment from damage to the bracket, and the like. Thus, the mud flap 10 can be readily customized for use in nonstandard shortie configurations.

The diamond pattern of the mud flap 10 can facilitate the breakup of trailing air vortices resulting in a mud flap demonstrating less drag as compared with mud flaps employing different or no patterning. A reduction in drag can also translate into improved fuel economy.

The open "flow-through" design utilizing arrays of recesses and ribs can reduce precipitation spray from parts of the vehicle, particularly the wheels, that can form a mist or "fog" which can obscure the vision of drivers in adjacent or following vehicles. Water droplets can pass through the recesses relatively undisturbed, without atomizing, or "smashing" of water droplets against a conventional mud flap, thereby reducing the incidence of mist or "fog" and facilitating safer travel on the road.

The orientation of the ribs and recesses can urge water accumulating on the mud flap to flow toward the center of the mud flap, i.e. the upper quadrant and lower quadrant vertical border 30A, 30B, and downward. The orientation of the ribs and recesses also provide resistance to warping of the mud flap that can accompany sailing or the impact of road debris.

The design also eliminates the need for anti-sail brackets due to the manner in which air is channeled through the recesses and moderates trailing air vortices, which can reduce the pressure differential across the mud flap surfaces and the resultant deflection of the mud flap. The design can also contribute to a reduction in maintenance costs by venting excess heat around tires and brakes minimizing premature wear.

The flaps can be nested when in a stack to provide a stable bundle for shipment and storage.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A motor vehicle mud flap for attachment behind a wheel of a motor vehicle, the mud flap comprising:
    a plate-like integral body having an obverse face, a suspension section, a quadrant section, and, optionally, an extension section in a longitudinal alignment;
    the suspension section configured for attachment to a mud flap bracket for suspension of the mud flap therefrom and;
    the quadrant section having an array of elongate through-openings positioned at an acute angle to a longitudinal axis of the mud flap; and
    the optional extension section having an array of elongate through-openings;
    wherein the array of elongate through-openings in the obverse face is defined by alternating elongate through-openings and ribs in parallel disposition;
    wherein each elongate through-opening in the obverse face is positioned within an elongate shallow recess and has a width less than the width of its respective recess; and
    wherein the elongate through-openings are configured so that water and air can flow through the elongate through-openings, and debris larger than the width of the elongate through-openings is deflected by the mud flap.

2. A motor vehicle mud flap according to claim 1 wherein each rib is configured to have a cruciate cross-section, thereby forming the recesses on the obverse face.

3. A motor vehicle mud flap according to claim 1 wherein the quadrant section has a first array of elongate through-openings oriented in a first direction, and a second array of elongate through-openings oriented in a second direction orthogonal to the first direction.

4. A motor vehicle mud flap according to claim 3 wherein the extension section has an array of elongate through-openings oriented at an acute angle relative to one of the first array of elongate through-opening and the second array of elongate through-openings.

5. A motor vehicle mud flap according to claim 1, wherein the quadrant section further comprising an imperforate section oriented at the acute angle to the longitudinal axis of the mud flap.

6. A motor vehicle mud flap according to claim 5 wherein the imperforate section is oriented in a downward direction and away from a central axis of the mud flap.

7. A motor vehicle mud flap according to claim 5 wherein the acute angle is about 45°.

8. A motor vehicle mud flap according to claim 1 wherein the obverse face and a reverse face have symmetry about a parallel plane between them as to at least the array of elongate through-openings and ribs in parallel disposition.

9. A motor vehicle mud flap according to claim 1 wherein the obverse face or a reverse face has a projecting rib and the other of the obverse and reverse faces has a recess corresponding to the rib, whereby multiple mud flaps can be stacked with ribs of one mud flap received in a corresponding recess in an overlying mud flap to reduce sliding of stacked mud flaps with respect to each other.

10. A motor vehicle mud flap according to claim 1 where-in the obverse face has symmetry about a longitudinal central axis.

11. A motor vehicle mud flap according to claim 1 wherein the quadrant section has four quadrants.

12. A motor vehicle mud flap according to claim 11 wherein the four quadrants have bilaterally symmetrical patterning formed by the arrays of elongate through-openings and ribs.

13. A motor vehicle mud flap according to claim 12 wherein the four quadrants are of equal size.

14. A motor vehicle mud flap according to claim 12 wherein the four quadrants are arranged in a quadrilateral configuration.

15. A motor vehicle mud flap for attachment behind a wheel of a motor vehicle, the mud flap comprising:
- a plate-like integral body having an obverse and a reverse face, a suspension section, a quadrant section, and, optionally, an extension section in a longitudinal alignment;
- the suspension section configured for attachment to a mud flap bracket for suspension of the mud flap therefrom and;
- the quadrant section having an array of elongate through-openings positioned at an acute angle to a longitudinal axis of the mud flap; and
- the optional extension section having an array of elongate through-openings;
- wherein the array of elongate through-openings in the obverse face is defined by alternating elongate through-openings and ribs in parallel disposition;
- wherein the elongate through-openings are configured so that water and air can flow through the elongate through-openings, and debris larger than the width of the elongate through-openings is deflected by the mud flap; and
- wherein the obverse face and the reverse face have symmetry about a parallel plane between them as to at least the array of elongate through-openings and ribs in parallel disposition.

16. A motor vehicle mud flap for attachment behind a wheel of a motor vehicle, the mud flap comprising:
- a plate-like integral body having an obverse and a reverse face, a suspension section, a quadrant section, and, optionally, an extension section in a longitudinal alignment;
- the suspension section configured for attachment to a mud flap bracket for suspension of the mud flap therefrom and;
- the quadrant section having an array of elongate through-openings positioned at an acute angle to a longitudinal axis of the mud flap; and
- the optional extension section having an array of elongate through-openings;
- wherein the array of elongate through-openings in the obverse face is defined by alternating elongate through-openings and ribs in parallel disposition;
- wherein the elongate through-openings are configured so that water and air can flow through the elongate through-openings, and debris larger than the width of the elongate through-openings is deflected by the mud flap; and
- wherein the obverse face or a reverse face has a projecting rib and the other of the obverse and reverse faces has a recess corresponding to the rib, whereby multiple mud flaps can be stacked with ribs of one mud flap received in a corresponding recess in an overlying mud flap to reduce sliding of stacked mud flaps with respect to each other.

* * * * *